United States Patent
Foster et al.

(10) Patent No.: US 7,247,112 B2
(45) Date of Patent: Jul. 24, 2007

(54) METHOD AND APPARATUS FOR COOLING AND LUBRICATING A HYBRID TRANSMISSION

(75) Inventors: Michael D. Foster, Carmel, IN (US); James A. Raszkowski, Indianapolis, IN (US); Gregory W. Kempf, Avon, IN (US)

(73) Assignees: GM Global Technology Operations, Inc., Detroit, MI (US); DaimlerChrysler AG, Stuttgart (DE); DaimlerChrysler Corporation, Auburn Hills, MI (US)

( * ) Notice: Subject to any disclaimer, the term of this patent is extended or adjusted under 35 U.S.C. 154(b) by 179 days.

(21) Appl. No.: 11/060,075

(22) Filed: Feb. 17, 2005

(65) Prior Publication Data
US 2005/0209040 A1    Sep. 22, 2005

Related U.S. Application Data

(60) Provisional application No. 60/555,141, filed on Mar. 22, 2004.

(51) Int. Cl.
*F16H 3/72*  (2006.01)
*F16H 57/04* (2006.01)

(52) U.S. Cl. ................................ 475/5; 475/159

(58) Field of Classification Search ............... 475/159, 475/161; 184/11.3
See application file for complete search history.

(56) References Cited

U.S. PATENT DOCUMENTS

| | | | |
|---|---|---|---|
| 2,403,579 A * | 7/1946 | Carpenter ................. | 184/6.12 |
| 4,971,185 A * | 11/1990 | Hayakawa et al. ....... | 192/85 R |
| 5,050,447 A * | 9/1991 | Hayakawa et al. ....... | 74/606 R |
| 5,230,664 A * | 7/1993 | Michioka et al. ............. | 474/43 |
| 6,474,444 B1 * | 11/2002 | Mochizuki ................. | 184/6.12 |
| 7,022,039 B2 * | 4/2006 | Hasegawa et al. .......... | 475/159 |
| 2002/0077209 A1* | 6/2002 | El-Antably et al. ......... | 475/159 |

* cited by examiner

*Primary Examiner*—Saul Rodriguez
*Assistant Examiner*—Edwin A. Young
(74) *Attorney, Agent, or Firm*—Christopher DeVries

(57) ABSTRACT

A method and apparatus for efficiently cooling and lubricating rotating components in a hybrid transmission is provided. By efficiently managing cooling flow to and between the rotating elements, flow requirements and associated pumping requirements within the drive unit are minimized. In addition, by providing a method for placing the fluid directly on the required components, spin losses associated with component contact with stray oil are reduced. Combined, the reduction in pumping and spin losses create a more efficient drive unit and an overall more efficient hybrid drive system which directly leads to higher fuel economy.

15 Claims, 4 Drawing Sheets

METHOD AND APPARATUS FOR COOLING AND LUBRICATING A HYBRID TRANSMISSION

CROSS REFERENCE TO RELATED APPLICATIONS

This application claims the benefit of U.S. Provisional Application 60/555,141, filed Mar. 22, 2004, which is hereby incorporated by reference in its entirety.

TECHNICAL FIELD

The present invention is drawn to a method for cooling and lubricating a hybrid transmission.

BACKGROUND OF THE INVENTION

Due to the desire for further improvements in vehicle fuel economy and reductions in emissions, there has been a strong interest in hybrid electric vehicles. Such vehicles typically incorporate a conventional internal combustion engine and one or more electric motors to assist in propulsion or energy storage depending on the mode of operation. To maximize fuel economy, each component within the system should be designed for optimal efficiency.

SUMMARY OF THE INVENTION

The present invention provides efficient cooling and lubrication of rotating components in a hybrid transmission. By efficiently managing cooling flow to and between the rotating elements, flow requirements and associated pumping requirements within the drive unit are minimized. In addition, by providing a method for placing the fluid directly on the required components, spin losses associated with component contact with stray oil are reduced. Combined, the reduction in pumping and spin losses create a more efficient drive unit and an overall more efficient hybrid drive system which directly leads to higher fuel economy.

The method of the present invention includes pumping fluid from a reservoir into a first rotating shaft. The first rotating shaft defines a flow passage through which the fluid is transferred and is preferably sealed by a first plurality of bushings. The first rotating shaft also defines a plurality of orifices through which the fluid may pass. After exiting the orifices of the first rotating shaft, the fluid is introduced into a clearance cavity between the first rotating shaft and a second rotating shaft. The clearance cavity is also preferably sealed by a second plurality of bushings. The fluid in the clearance cavity may be applied through an orifice in the second rotating shaft directly onto a planet carrier of a planet gear assembly to cool and lubricate the planet carrier. The first and second plurality of bushings may be cooled and lubricated by allowing a predetermined amount of fluid to leak across one or more bushing contact surfaces.

According to a preferred embodiment of the present invention, the fluid leaked by the bushings may be implemented to cool and lubricate one or more thrust bearings.

According to another preferred embodiment of the present invention, the fluid leaked by the bushings may be implemented to provide additional cooling and lubrication of the planet carrier.

According to yet another preferred embodiment of the present invention, the fluid applied to the planet carrier may be redirected by a diverter to more optimally cool the planet carrier.

According to still another preferred embodiment of the present invention, catchers may be implemented to catch stray fluid and thereby avoid excess spin losses.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
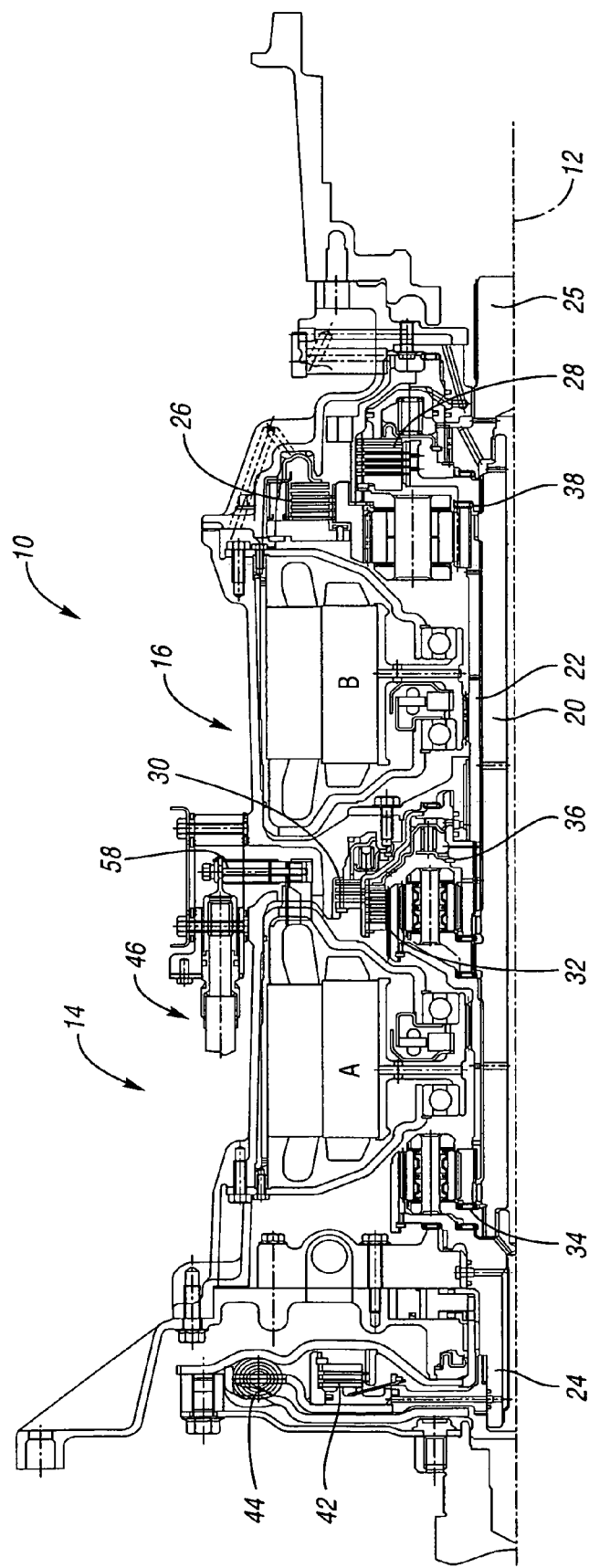
FIG. 1 is a schematic fragmentary cross-sectional view of a hybrid electromechanical transmission in accordance with the invention.

Referring to the drawings, wherein like reference numbers refer to like components, FIG. 1 shows the upper half of a transmission 10, in cross sectional view. The lower half of the transmission (not shown) is disposed on the opposite side of center axis 12. First and second electric motor modules 14, 16, respectively, are disposed about the center axis 12 within the transmission 10. A main shaft 20 is longitudinally disposed, rotatable about the center axis 12. A plurality of inner shafts, such as inner shaft 22, are concentrically disposed about the main shaft 20, and are likewise rotatable about the center axis. An input shaft 24 is disposed forward of the main shaft 20 and is operable for transferring power from an engine (not shown) to the transmission 10. An output shaft 25 is disposed rearward of the main shaft 20. The main shaft 20 and the input shaft 24 are preferably hollow to facilitate the cooling and lubrication of the transmission 10 as will be described in detail hereinafter. Engagement of one or more of a plurality of clutches included in the transmission 10 (first, second, third and fourth clutches, 26, 28, 30 and 32 respectively, being shown) interconnects one or more of first, second and third planetary gear sets 34, 36, and 38, respectively, to transfer power at varying ratios to an output member (not shown). As will be readily understood by those skilled in the art, each of the planetary gear sets includes a sun gear member, a planet carrier assembly member and a ring gear member. A fifth clutch, referred to as a lockout clutch 42, is operable for locking out torsion isolator 44 (also referred to as damper springs) from surrounding structural elements, and to provide a direct connection between the engine and transmission.

Figure 2:
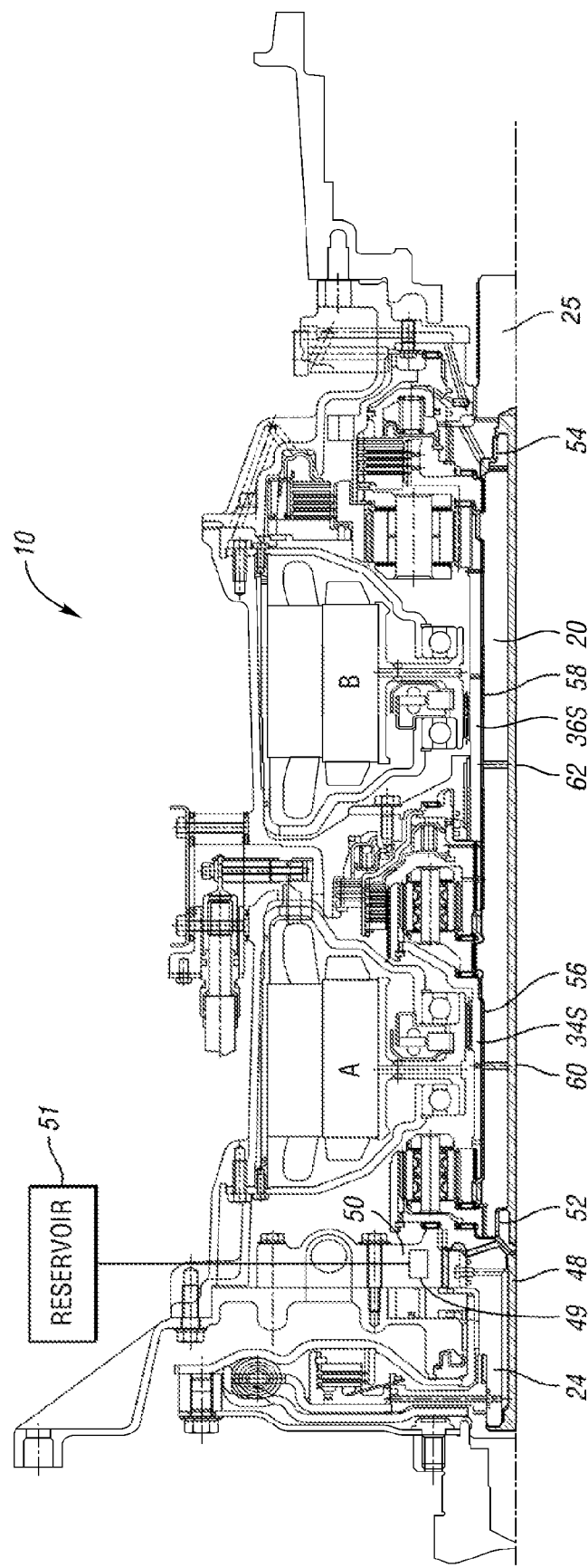
FIG. 2 is a schematic fragmentary cross-sectional view of a hybrid electromechanical transmission.

Referring to FIG. 2, transmission lubrication fluid 48 is transferred by a pump 49, located in a front support 50, from a fluid reservoir 51 into the center of the main shaft 20 and input shaft 24, which cooperate to run the entire length of the drive unit. Bushing 52 (best shown in FIGS. 3) acts to seal the fluid 48 between the input shaft 24 and main shaft 20 as they rotate and move axially relative to one another. Bushing 54 (best shown in FIG. 4) acts to seal the fluid 48 between the main shaft 20 and output shaft 25 as they rotate and move axially relative to one another. The bushings 52, 54 are also adapted for maintaining pressure within the main shaft 20 to optimally apply the lubrication fluid 48.

To ensure lubrication fluid is delivered directly to the required locations, components used for connecting various elements of the rotating group are incorporated into the lubrication scheme of the present invention. More precisely, several of the shafts concentric with the main shaft 20, such as sun gear shafts 34S and 36S (shown in FIGS. 3 and 4), are used to transfer the pressurized fluid.

Figure 3:
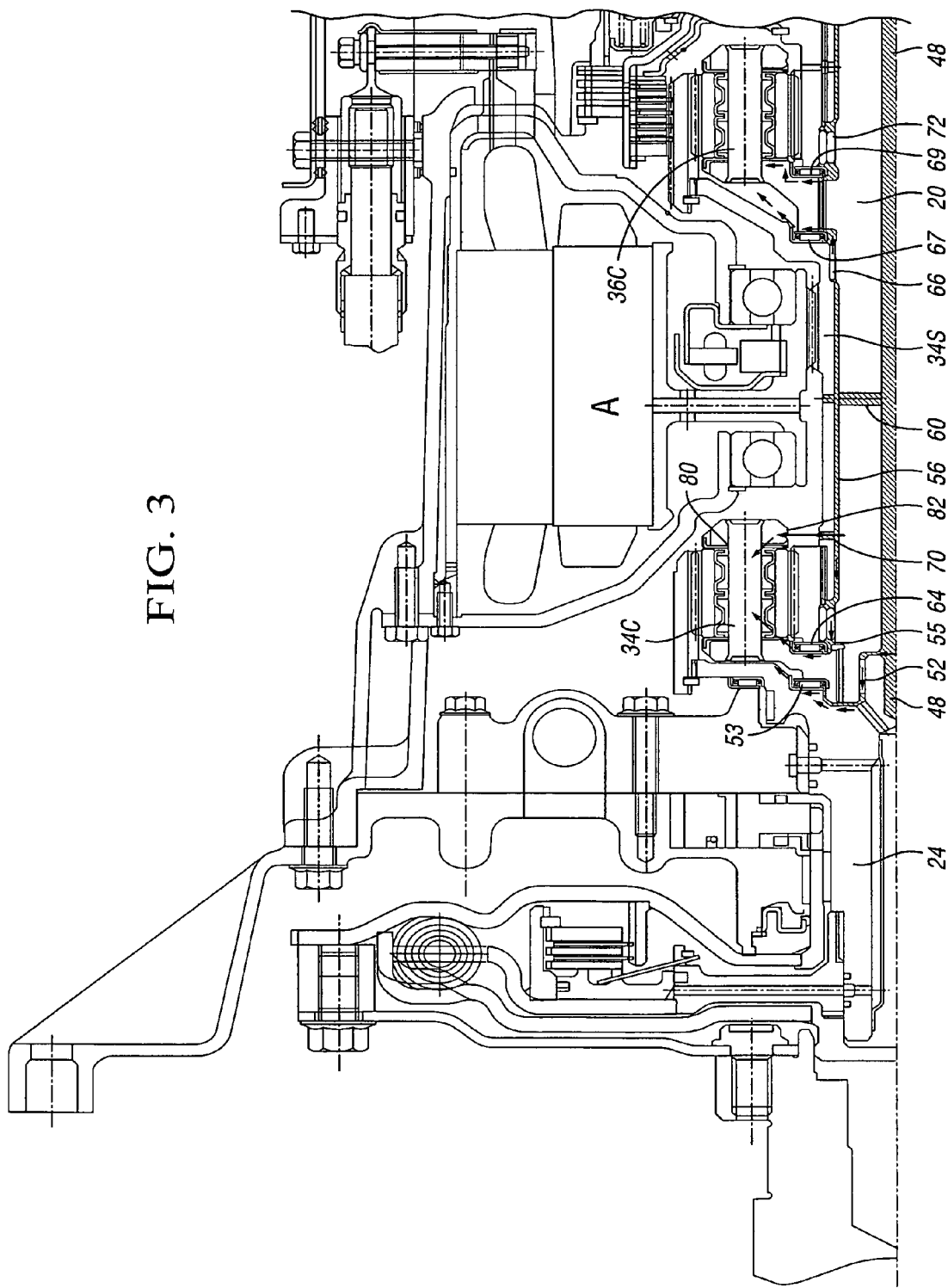
FIG. 3 is a schematic fragmentary cross-sectional view of a frontward portion of the transmission of FIG. 1.
Figure 4:
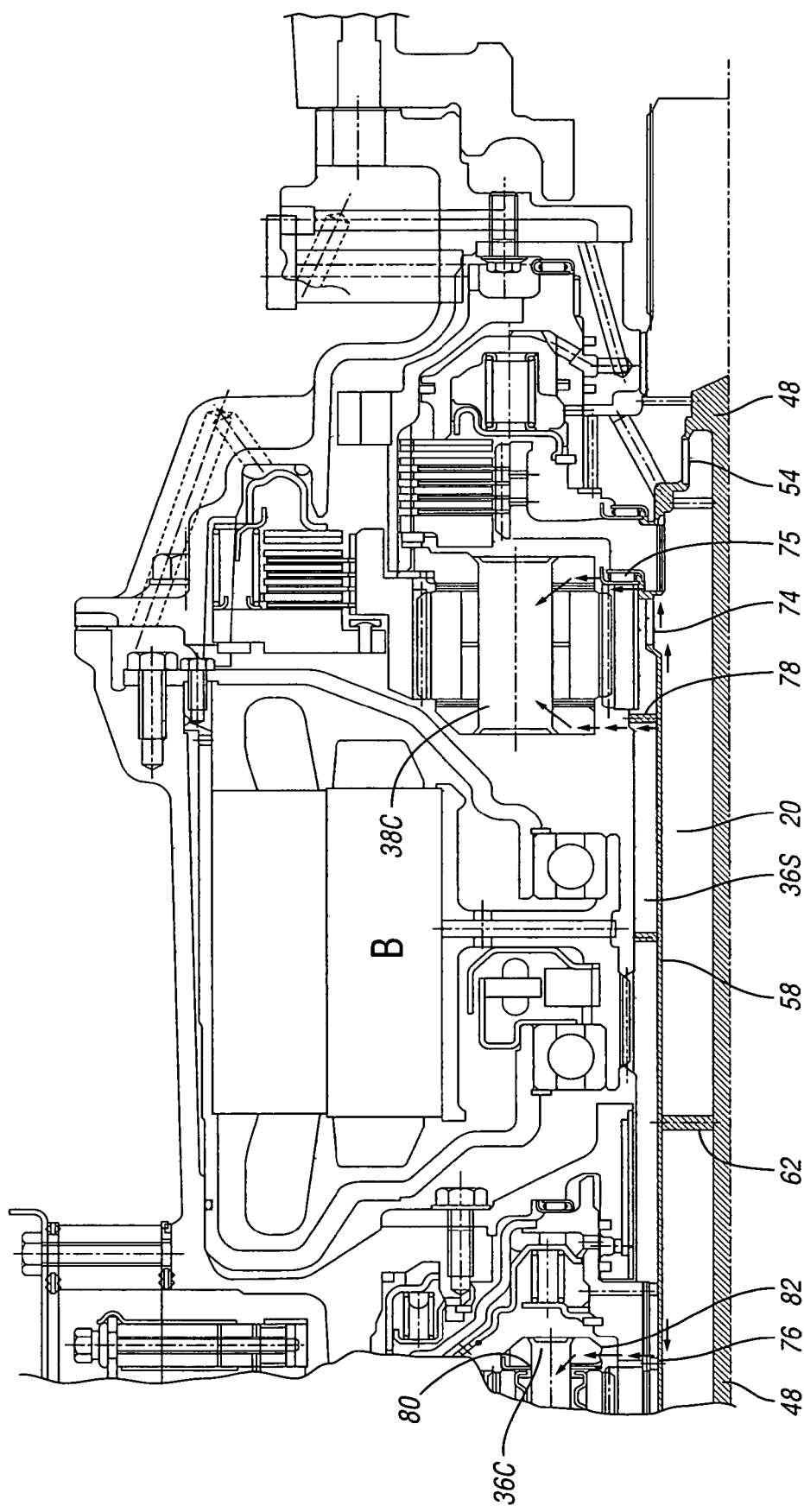
FIG. 4 is a schematic fragmentary cross-sectional view of a rearward portion of the transmission of FIG. 1.

Referring to FIG. 3, the clearance between the sun gear shaft 34S and the main shaft 20 defines a clearance cavity 56. Similarly, as shown in FIG. 4, the clearance between the sun gear shaft 36S and the main shaft 20 defines a clearance cavity 58. The main shaft 20 defines a plurality of outlet ports 60, 62 adapted to release the pressurized fluid from the main shaft 20 into the clearance cavities 56, 58, respectively.

Referring again to FIG. 3, bushing 52, as well as bushings 64, 66 are adapted to maintain fluid pressure in the cavity 56. Cooling and lubrication of the bushings 52, 64 and 66 is provided by allowing a predetermined amount of lubrication fluid 48 to leak between the bushings 52, 64 and 66 and their respective rotating shaft 20 or 24. More precisely, bushing 52 is cooled and lubricated by allowing a predetermined amount of lubrication fluid 48 to leak between the bushing 52 and the input shaft 24. Bushings 64 and 66 are cooled and lubricated by allowing a predetermined amount of lubrication fluid 48 to leak between the bushings 64, 66 and the main shaft 20. The amount of bushing leakage is controllable by adjusting the fit between a given bushing and the rotating shaft inserted therein, and/or adjusting the pressure of the lubrication fluid 48. To improve lubrication efficiency, this bushing leakage is then redirected for lubrication of other components as will be described in detail hereinafter.

The sun gear shaft 34S defines an orifice 70. Pressurized lubrication fluid 48 is dispersed from the cavity 56 through the orifice 70 and onto the planet carrier 34C, as shown by arrows representing fluid flow, to cool and lubricate the planet carrier 34C. The size of the orifice 70 is preferably selected based on the cooling/lubrication needs of the planet carrier 34C in a particular application. Additionally, the amount of fluid 48 delivered through the orifice 70 may be varied by adjusting the fluid pressure. The planet carrier 34C is also cooled and lubricated by lubrication fluid 48 leaking from the bushings 52, 64 as shown by the arrows representing fluid flow in FIG. 3. According to a preferred embodiment, the lubrication fluid 48 leaking from bushing 52 additionally cools and lubricates a thrust bearing 53 as it is diverted to the planet carrier 34C. Similarly, the lubrication fluid 48 leaking from bushing 64 cools and lubricates a thrust bearing 55 as it is diverted to the planet carrier 34C.

Referring to FIG. 4, bushing 54, as well as bushing 72 (shown in FIG. 3) and bushing 74 are adapted to maintain fluid pressure in the cavity 58 in a manner similar to that described hereinabove for cavity 56. The bushings 54, 72 and 74 are cooled and lubricated by allowing a predetermined amount of lubrication fluid 48 to leak between each of the bushings and the main shaft 20. The amount of bushing leakage is controllable by adjusting the fit between a given bushing and the rotating shaft inserted therein, and/or adjusting the pressure of the lubrication fluid 48. To improve lubrication efficiency, this bushing leakage is then redirected for lubrication of other components as will be described in detail hereinafter.

The sun gear shaft 36S defines an orifice 76. Pressurized lubrication fluid 48 is dispersed from the cavity 58 through the orifice 76 and onto the planet carrier 36C, as shown by the by arrows representing fluid flow, to cool and lubricate the planet carrier 36C. The size of the orifice 76 is preferably selected based on the cooling/lubrication needs of the planet carrier 36C in a particular application. Additionally, the amount of fluid 48 delivered through the orifice 76 may be varied by adjusting the fluid pressure. As shown in FIG. 3, the planet carrier 36C is also cooled and lubricated by lubrication fluid 48 leaking from the bushings 66, 72 as shown by the arrows representing fluid flow. According to a preferred embodiment, the lubrication fluid 48 leaking from bushing 66 additionally cools and lubricates a thrust bearing 67 as it is diverted to the planet carrier 36C. Similarly, the lubrication fluid 48 leaking from bushing 72 cools and lubricates a thrust bearing 69 as it is diverted to the planet carrier 36C.

Referring again to FIG. 4, the sun gear shaft 36S also defines orifice 78. Pressurized lubrication fluid 48 is dispersed from the cavity 58 through the orifice 78 and onto the planet carrier 38C, as shown by the arrows representing fluid flow, to cool and lubricate the planet carrier 38C. The size of the orifice 78 is preferably selected based on the cooling/lubrication needs of the planet carrier 38C in a particular application. Additionally, the amount of fluid 48 delivered through the orifice 78 may be varied by adjusting the fluid pressure. The planet carrier 38C is also cooled and lubricated by lubrication fluid 48 leaking from the bushing 74 as shown by the arrows representing fluid flow. According to a preferred embodiment, the lubrication fluid 48 leaking from bushing 74 additionally cools and lubricates a thrust bearing 75 as it is diverted to the planet carrier 38C.

Referring to FIGS. 3 and 4, a plurality of diverters 80 are preferably utilized to direct the fluid exiting the shaft orifices 70 and 76 onto the proper components. A plurality of catchers 82 are preferably implemented to minimize stray fluid which may otherwise cause excess spin losses.

While the best modes for carrying out the invention have been described in detail, those familiar with the art to which this invention relates will recognize various alternative designs and embodiments for practicing the invention within the scope of the appended claims.

The invention claimed is:

1. An apparatus for cooling and lubricating a hybrid transmission comprising:
    a fluid reservoir;
    a first rotating shaft defining a flow passage therein, said first rotating shaft further defining a first plurality of orifices;
    a second rotating shaft defining a second plurality of orifices, the first and second rotating shafts defining a clearance cavity therebetween, said clearance cavity being in fluid communication with said first and second plurality of orifices;
    a planet gear assembly having a planet carrier;
    a first plurality of bushings positioned external to said clearance cavity and adapted to seal the flow passage of the first rotating shaft, said first plurality of bushings being configured to leak a predetermined amount of fluid to cool and lubricate the bushings; and
    a pump adapted to transfer fluid from the reservoir, into the flow passage of the first rotating shaft, through said first plurality of orifices, into said clearance cavity, through said second plurality of orifices and onto the planet carrier such that the planet carrier is cooled and lubricated.

2. The apparatus of claim 1, wherein the fluid leaked by said first plurality of bushings is implemented to cool and lubricate a first thrust bearing, and thereafter the leaked fluid is implemented to cool and lubricate said planet carrier.

3. The apparatus of claim 1 further comprising a second plurality of bushings adapted to seal said clearance cavity, said second plurality of bushings being configured to leak a predetermined amount of fluid to cool and lubricate said second plurality of bushings.

4. The apparatus of claim 3, wherein the fluid leaked by said second plurality of bushings is implemented to cool and lubricate a second thrust bearing, and thereafter the leaked fluid is implemented to cool and lubricate said planet carrier.

5. The apparatus of claim 1 further comprising a plurality of diverters to redirect the fluid and thereby optimally cool the planet carrier.

6. The apparatus of claim 1 further comprising a plurality of catchers to catch stray fluid and thereby avoid excess spin losses.

7. An apparatus for cooling and lubricating a hybrid transmission comprising:
 a fluid reservoir;
 a first rotating shaft defining a flow passage therein, said first rotating shaft further defining a first plurality of orifices;
 a first plurality of bushings adapted to seal the flow passage of said first rotating shaft, said first plurality of bushings being configured to leak a predetermined amount of fluid to cool and lubricate the said first plurality of bushings;
 a second rotating shaft defining a second plurality of orifices, the first and second rotating shafts defining a clearance cavity therebetween, said clearance cavity being in fluid communication with said first and second plurality of orifices;
 a second plurality of bushings adapted to seal said clearance cavity, said second plurality of bushings being configured to leak a predetermined amount of fluid to cool and lubricate said bushings;
 a planet gear assembly having a planet carrier; and
 a pump adapted to transfer fluid from the reservoir, into the flow passage of the first rotating shaft, through said first plurality of orifices, into said clearance cavity, through said second plurality of orifices and onto the planet carrier such that the planet carrier is cooled and lubricated.

8. The apparatus of claim 7 further comprising a plurality of diverters to redirect the fluid from said second plurality of orifices and thereby optimally cool the planet carrier.

9. The apparatus of claim 7 farther comprising a plurality of catchers to catch stray fluid and thereby avoid excess spin losses.

10. A method for cooling and lubricating a hybrid transmission comprising:
 providing a first rotating shaft defining a flow passage therein, said first rotating shaft further defining a plurality of orifices;
 sealing the flow passage within said first rotating shaft;
 transferring fluid from a reservoir into the first rotating shaft;
 forming a clearance cavity between the first rotating shaft and a second rotating shaft, said clearance cavity being in fluid communication with the orifices;
 sealing the clearance cavity with a plurality of bushings;
 dispensing the fluid from said plurality of orifices into the clearance cavity; and
 applying the fluid from the clearance cavity through the second rotating shaft onto a planet carrier of a planetary gearset to cool and lubricate the planet carrier.

11. The method of claim 10 further comprising cooling and lubricating the bushings by allowing a predetermined amount of fluid to leak across a surface of the bushings.

12. The method of claim 11 further comprising directing the leaked fluid onto the planet carrier to cool and lubricate the planet carrier.

13. The method of claim 12 wherein said applying the fluid from the clearance cavity includes redirecting the fluid to optimally cool the planet carrier.

14. The method of claim 13 further comprising catching stray fluid to avoid excess spin losses.

15. The method of claim 10 wherein said transferring fluid from a reservoir includes pumping the fluid at a predetermined pressure such that the rate at which fluid is applied to the planet carrier may be varied.

* * * * *